(12) United States Patent
Liu et al.

(10) Patent No.: US 10,571,956 B2
(45) Date of Patent: Feb. 25, 2020

(54) DISPLAY PANEL AND DISPLAY DEVICE

(71) Applicant: WUHAN TIANMA MICRO-ELECTRONICS CO., LTD., Wuhan (CN)

(72) Inventors: Yanhua Liu, Wuhan (CN); Mingyan Huang, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 16/245,189

(22) Filed: Jan. 10, 2019

(65) Prior Publication Data

US 2019/0146549 A1 May 16, 2019

(30) Foreign Application Priority Data

Aug. 30, 2018 (CN) .......................... 2018 1 1004693

(51) Int. Cl.
*G06F 1/16* (2006.01)
*G02F 1/1333* (2006.01)
*G09F 9/30* (2006.01)

(52) U.S. Cl.
CPC ...... *G06F 1/1601* (2013.01); *G02F 1/133308* (2013.01); *G06F 1/1637* (2013.01);
(Continued)

(58) Field of Classification Search
CPC .... G06F 1/1601; G06F 1/1626; G06F 1/1652; G06F 1/1679; G06F 1/1681;
(Continued)

(56) References Cited

U.S. PATENT DOCUMENTS 8,445,923 B2 * 5/2013 Lee ..................... H01L 51/5237
257/88
2007/0121051 A1 * 5/2007 Yokoyama .......... G02F 1/13394
349/156
(Continued)

FOREIGN PATENT DOCUMENTS

CN      103996695 A      8/2014

OTHER PUBLICATIONS

CN103996695A (Year: 2014).*

*Primary Examiner* — Jenny L Wagner
*Assistant Examiner* — Ingrid D Wright
(74) *Attorney, Agent, or Firm* — Kilpatrick Townsend & Stockton, LLP

(57) ABSTRACT

The present disclosure provides a display panel and a display device. The display panel includes a first substrate, a second substrate, and at least one support structure. The first substrate and the second substrate are disposed opposite to each other. A region between the first substrate and the second substrate includes a display region and an encapsulation region surrounding the display region. A distance between the first substrate and the second substrate corresponding to the display region is h1, and a distance between the first substrate and the second substrate corresponding to the encapsulation region is h2, where h1>h2. The at least one support structure is disposed between the display region and the encapsulation region, and each of the at least one support structure has a height of h3, where h2<h3<h1.

15 Claims, 5 Drawing Sheets

(52) U.S. Cl.
CPC .... *G09F 9/30* (2013.01); *G02F 2001/133322* (2013.01); *G02F 2001/133354* (2013.01); *G02F 2001/133388* (2013.01)

(58) Field of Classification Search
CPC ............ G06F 1/1637; G02F 1/133308; G02F 2001/133354; G02F 2001/133322; G02F 2001/133388; G09F 9/30
See application file for complete search history.

(56) References Cited

U.S. PATENT DOCUMENTS

| | | | |
|---|---|---|---|
| 2013/0127770 A1* | 5/2013 | Trend | G06F 3/044 345/174 |
| 2016/0195742 A1* | 7/2016 | Kim | G02F 1/133788 349/33 |

* cited by examiner

DISPLAY PANEL AND DISPLAY DEVICE

CROSS-REFERENCE TO RELATED APPLICATIONS

The present application claims priority to Chinese Patent Application No. 201811004693.6, filed on Aug. 30, 2018, the content of which is incorporated herein by reference in its entirety.

FIELD

The present disclosure relates to the field of display technologies, and in particular, to a display panel and a display device.

BACKGROUND

In the related art, the display panel includes a first substrate and a second substrate that are disposed opposite to each other. A display region and an encapsulation region surrounding the display region are formed between the first substrate and the second substrate. A distance between the two substrates corresponding to the display region is larger than a distance between the two substrates corresponding to the encapsulation region. Moreover, a support pillar is further disposed in a region between the display region and the encapsulation region for supporting in this region.

However, with the abovementioned setting manner of the support pillar in the related art, the first substrate corresponding to the region between the display region and the encapsulation region would be put up too high by the support pillar, causing a large deformation of the first substrate. As a result, when the display panel falls off, uneven force would lead to the first substrate, thereby resulting in poor mechanical strength of the display panel.

SUMMARY

In view of this, the present disclosure provides a display panel and a display device, aiming to reduce deformation of a substrate of the display panel and improve mechanical strength of the display panel.

In one embodiment, the present disclosure provides a display panel. The display panel includes: a first substrate; a second substrate; and at least one support structure. The first substrate and the second substrate are disposed opposite to each other. A region between the first substrate and the second substrate includes a display region and an encapsulation region surrounding the display region. A distance between the first substrate and the second substrate corresponding to the display region is h1, and a distance between the first substrate and the second substrate corresponding to the encapsulation region is h2, where h1>h2. The at least one support structure is disposed between the display region and the encapsulation region, and each of the at least one support structure has a height of h3, where h2<h3<h1.

In another embodiment, the present disclosure provides a display device, and the display device includes the display panel described above.

BRIEF DESCRIPTION OF DRAWINGS

In order to illustrate embodiments of the present disclosure, the accompanying drawings used in the embodiments are introduced as follows. It should be noted that the drawings described as follows are part of the embodiments of the present disclosure.

DESCRIPTION OF EMBODIMENTS

Embodiments of the present disclosure will be described in detail as follows with reference to the accompanying drawings.

It should be noted that, the described embodiments are merely exemplary embodiments of the present disclosure, which shall not be interpreted as providing limitations to the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association describing associated objects, indicating that there may be three relationships, for example, "A and/or B" indicates three cases, i.e., only A existing, both A and B existing, and only B existing. In addition, the character "/" herein generally indicates that the associated objects form an "or" relationship therebetween.

It should be understood that although a substrate may be described using the terms of "first", "second", etc., in the embodiments of the present disclosure, the substrate will not be limited to these terms. These terms are merely used to distinguish substrates from one another. For example, without departing from the scope of the embodiments of the present disclosure, a first substrate may also be referred to as a second substrate, and similarly, a second substrate may also be referred to as a first substrate.

Figure 1:
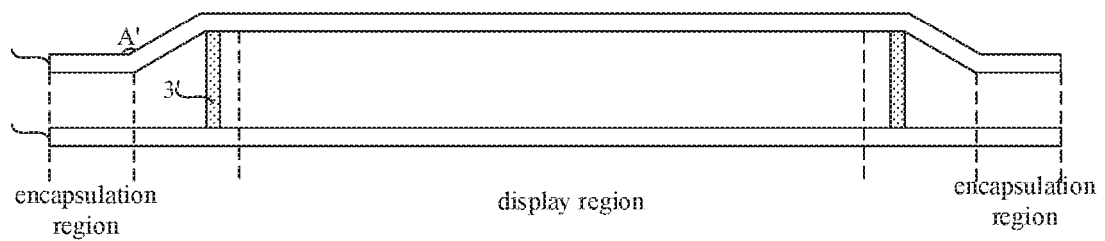
FIG. 1 is a schematic structural diagram of a display panel in the related art.

FIG. 1 is a schematic structural diagram of a display panel in the related art. As shown in FIG. 1, the display panel includes a first substrate 1' and a second substrate 2' that are disposed opposite to each other. A display region and an encapsulation region surrounding the display region are formed between the first substrate 1' and the second substrate 2'. A distance between the two substrates corresponding to the display region is larger than a distance between the two substrates corresponding to the encapsulation region. Moreover, a support pillar 3' is further disposed in a region between the display region and the encapsulation region for supporting in this region.

However, with the abovementioned setting manner of the support pillar 3', the first substrate 1' corresponding to the region between the display region and the encapsulation region would be put up too high by the support pillar 3', causing a large deformation of the first substrate 1'. As a result, when the display panel falls off, uneven force would lead to the first substrate 1', thereby resulting in poor mechanical strength of the display panel.

Figure 2:
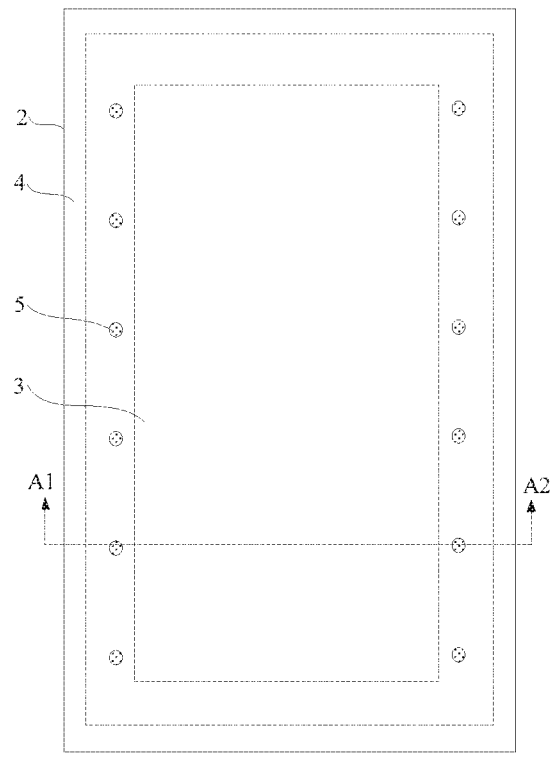
FIG. 2 is a top view of a display panel according to an embodiment of the present disclosure.
Figure 3:
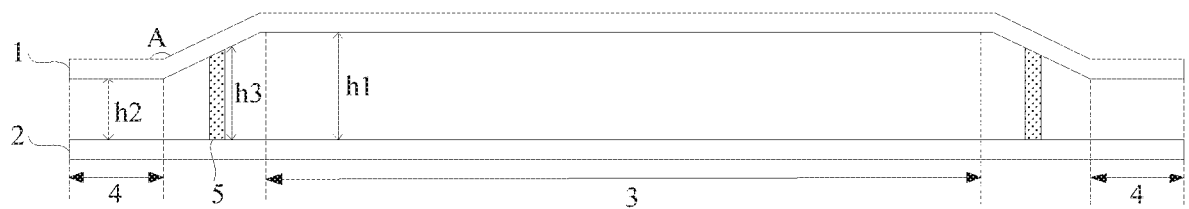
FIG. 3 is a cross-sectional view along line A1-A2 of FIG. 2.

An embodiment of the present disclosure provides a display panel. FIG. 2 is a top view of a display panel according to an embodiment of the present disclosure, and FIG. 3 is a cross-sectional view along line A1-A2 of FIG. 2. As shown in FIG. 2 and FIG. 3, the display panel includes a first substrate 1 and a second substrate 2 that are disposed opposite to each other. A region between the first substrate 1 and the second substrate 2 includes a display region 3 and an encapsulation region 4 surrounding the display region 3. A distance between the first substrate 1 and the second substrate 2 corresponding to the display region 3 is h1, and a distance between the first substrate 1 and the second substrate 2 corresponding to the encapsulation region 4 is h2, where h1>h2. The display panel further includes at least one support structure 5 disposed between the display region 3 and the encapsulation region 4. The support structure 5 has a height of h3, where h2<h3<h1.

Figure 4:
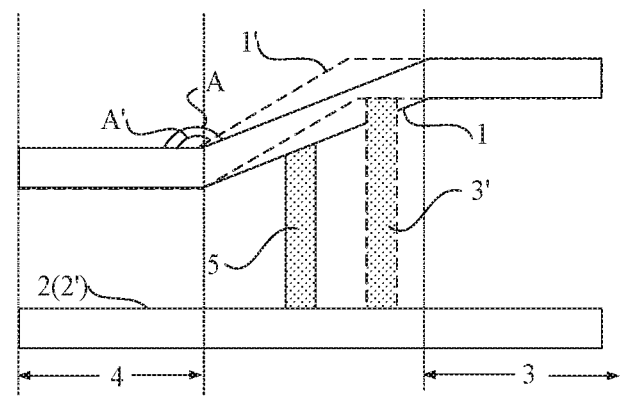
FIG. 4 is a schematic diagram illustrating a comparison between a deformation angle A of a first substrate in an embodiment of the present disclosure and a deformation angle A' of a first substrate in the related art.

FIG. 4 is a schematic diagram illustrating a comparison between a deformation angle A of a first substrate in an embodiment of the present disclosure and a deformation angle A' of a first substrate in the related art. As shown in FIG. 4, it can be seen that under same conditions, in the related art, a portion of the first substrate 1' between the display region 3 and the encapsulation region 4 would be put up too high by the support pillar 3', and a distance between the portion of the first substrate 1' and the second substrate 2 is equal to h1. This would result in a sharp turning angle occurring in the first substrate 1' in a transition region of the first substrate 1' from the display region 3 towards the encapsulation region 4, thereby leading to a large deformation for the first substrate 1'. However, in the display panel provided by this embodiment of the present disclosure, a height h3 of the support structure 5 is reduced to be smaller than the distance h1 between the first substrate 1 and the second substrate 2 corresponding to the display region 3 and to be larger than distance h2 between the first substrate 1 and the second substrate 2 corresponding to the encapsulation region 4. In this way, a portion of the first substrate 1 between the display region 3 and the encapsulation region 4 will not be put up too high by the support structure 5, such that the deformation angle A of the first substrate 1 is greater than the deformation angle A' in the related art, thereby achieving a smooth transition for the first substrate 1 between the display region 3 and the encapsulation region 4 and thus effectively alleviating the deformation of the first substrate 1. In this way, when the display panel falls off, the problem that uneven force leads to the first substrate 1 due to the deformation of the first substrate 1 can be alleviated, thereby improving the mechanical strength of the display panel and reducing the possibility of damage.

Figure 5:
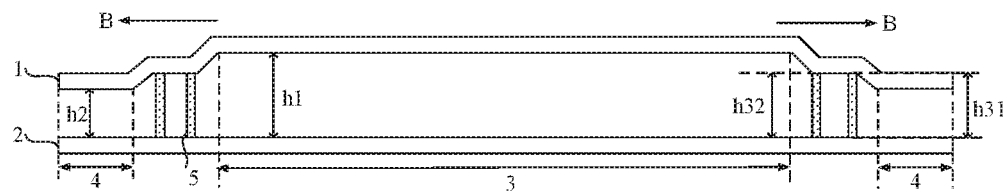
FIG. 5 is a cross-sectional view of another display panel according to an embodiment of the present disclosure.

In an embodiment, as shown in FIG. 5, which is a cross-sectional view of another display panel according to an embodiment of the present disclosure, at least two support structures 5 are provided along a direction (shown by an arrow B in the figure) from the display region 3 towards the encapsulation region 4. The highest support structure 5 has a height of h31, and the lowest support structure 5 has a height of h32, where h2<h32≤h31<h1.

On the one hand, a plurality of support structures 5 are arranged along the direction from the display region 3 towards the encapsulation region 4, which can improve the supporting effect on the first substrate 1 by the support structures 5, thereby improving the support stability of the display panel. On the other hand, since all heights of the plurality of support structures 5 are in a range from h1 to h2, no support structure 5 will put up the first substrate 1 too high, and there will be a plurality of small slopes for the first substrate 1 between the display region 3 and the encapsulation region 4, thereby reducing the deformation of the first substrate 1.

It should be noted that the heights of the plurality of support structures 5 shown in FIG. 5 are merely illustrative, and in practical applications, the heights of the plurality of support structures 5 may be the same or different and the support structures 5 having different heights can be arranged in any manner. Since all heights of the plurality of support structures 5 are smaller than h1, the first substrate 1 can have a transition from a height smaller than h1 to a height of h3 between the display region 3 and the encapsulation region 4 regardless of an arrangement of the support structures 5 according to their heights, thereby effectively reducing the deformation of the first substrate 1.

In an embodiment, a plurality of sets of support structures is provided between the display region 3 and the encapsulation region 4, and each set of support structures includes a plurality of support structures 5 having a same height. The respective heights in the plurality of sets of support structures 5 are decreasing along the direction from the display region 3 toward the encapsulation region 4. In this arrangement, when the first substrate 1 transitions from the display region 3 towards the encapsulation region 4, the distance between the first substrate 1 and the second substrate 2 may decrease with multiple slopes, thereby reducing the deformation of the first substrate 1. Moreover, including a plurality of support structures 5 having a same height in each set of support structures can improve the support stability of the support structures 5 at different portions of the first substrate 1, thereby improving the support stability of the entire display panel.

Figure 6:
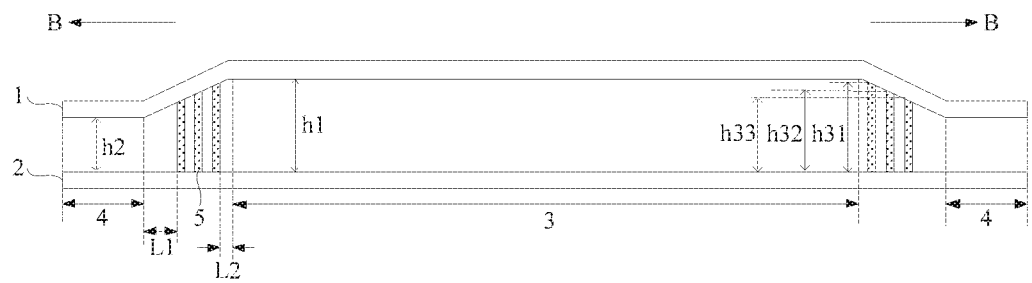
FIG. 6 is a cross-sectional view of still another display panel according to an embodiment of the present disclosure.

In an embodiment, as shown in FIG. 6, which is a cross-sectional view of still another display panel according to an embodiment of the present disclosure, a plurality of support structures 5 is provided along the direction (shown by an arrow B in the figure) from the display region 3 towards the encapsulation region 4, and heights of the plurality of support structures 5 are decreased along the direction from the display region 3 towards the encapsulation region 4.

With such an arrangement, under a premise of improving the support stability of the display panel, the respective heights of the plurality of support structures 5 are decreased one by one in such a manner that a distance between the substrate 1 and the second substrate 2 is gradually reduced in a transition region of the first substrate 1 from the display region 3 towards the encapsulation region 4, until a height of a support structure is close to a height between the first substrate 1 and the second substrate 2 corresponding to the encapsulation region 4. This can achieve a smooth transition for the first substrate 1, thereby reducing the deformation of the first substrate 1.

Further, a height difference between every two adjacent support structures 5 can be set to be a same value. For example, as shown in FIG. 6, $h31-h32=h32-h33$. A linear functional relation among the heights of the plurality of support structures 5 can allow the first substrate 1 to have a flat surface in the region corresponding to positions where the plurality of support structures 5 are arranged, which can avoid a turning angle forming in this region for the first substrate 1 and thus further reduce the deformation of the first substrate 1, while improving the support stability of the display panel.

In addition, h3 corresponding to the plurality of support structures 5, h1 and h2 can be in a linear functional relation. In this case, the first substrate 1 has a flat surface in the entire region between the display region 3 and the encapsulation region 4 and no unevenness occurs for the first substrate 1 in this region. This can improve the support stability of the display panel and reduce the deformation of the first substrate 1. Further, when the display panel falls off, this can avoid uneven force caused by the unevenness of the first substrate 1, thereby further improving the mechanical strength and resistance to fall off of the display panel.

Figure 7:
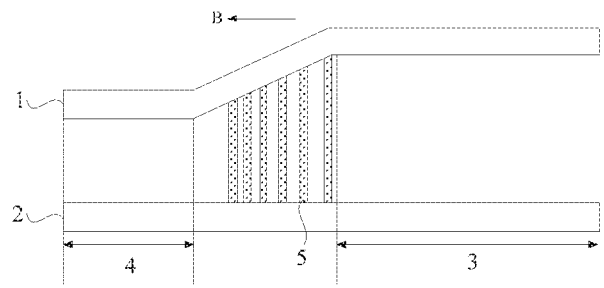
FIG. 7 is a partial cross-sectional view of yet still another display panel according to an embodiment of the present disclosure.

There is a difference between the distance between the first substrate 1 and the second substrate 2 corresponding to the encapsulation region 4 and the distance between the first substrate 1 and the second substrate 2 corresponding to the display region 3, and compared with the display region 3, the encapsulation region 4 is a region surrounding the display region 3 that has a smaller area. Therefore, when the display panel falls off, stress uniformity of the encapsulation region 4 is lower than stress uniformity of the display region 3, resulting in that the encapsulation region 4 is more likely to be damaged. Based on this, as shown in FIG. 7, which is a partial cross-sectional view of yet still another display panel according to an embodiment of the present disclosure, distances between every two adjacent support structures 5 are gradually decreased along a direction from the display region 3 towards the encapsulation region 4 (shown by an arrow B in the figure). That is, the closer to the encapsulation region 4, the larger density the support structures 5 are arranged in. In this way, the support structures 5 can achieve better support in the encapsulation region 4, thereby improving the support stability in this region and thus reducing the possibility of damage for the encapsulation region 4 when the display panel falls off.

In the manufacturing process of the display panel, an encapsulation structure is usually formed by a laser spot process. If the support structure 5 is too close to the encapsulation region 4, the support structure 5 may burned by the laser spot and then melts, which would affect its performance. Therefore, in order to avoid the influence of the laser spot on the support structure 5, with further reference to FIG. 6, a minimum distance L1 between the support structure 5 and the encapsulation region 4 can be set to be greater than or equal to 100 µm.

It should be noted that the minimum distance L1 between the support structure 5 and the encapsulation region 4 as described above refers to a distance between the encapsulation region 4 and one support structure 5 closest to the encapsulation region 4 among a plurality of support structures 5 arranged along the direction from the display region 3 towards the encapsulation region 4.

Moreover, when forming the support structures 5, there is inevitably a misalignment. If there is one support structure 5 arranged to be too close to the display region 3, when the support structure 5 is deviated from its predetermined position due to the misalignment, the support structure 5 may shield an aperture region of sub-pixels in the display region 3. Then, when the sub-pixels in the display region 3 emit light, light may not get out from the aperture region shielded by the support structure 5, resulting in a black spot in this region and thus reducing the display performance. Therefore, in order to prevent the support structure 5 from shielding the aperture region of the sub-pixels in the display region 3, with further reference to FIG. 6, a minimum distance L2 between the support structures 5 and the display region 3 can be set to be greater than or equal to 5 µm.

It should be noted that the minimum distance L2 between the support structures 5 and the display region 3 as described above refers to a distance between one support structure 5 closest to the display region 3 among a plurality of support structures 5 arranged along the direction from the display region 3 towards the encapsulation region 4.

Figure 8:
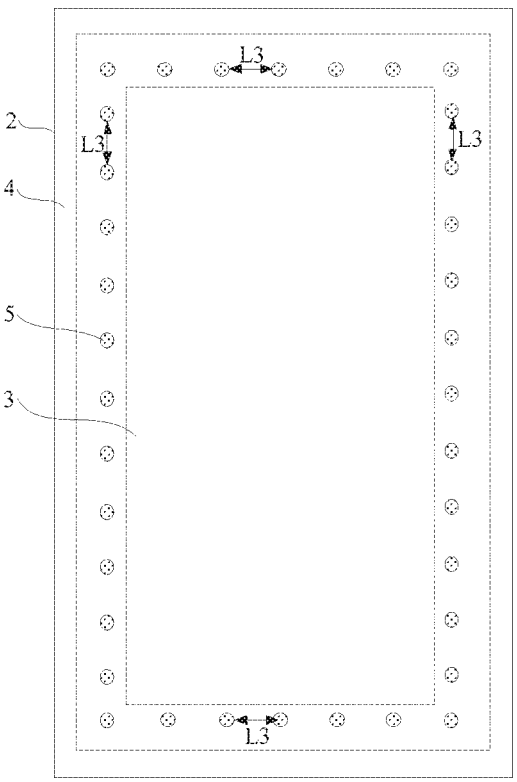
FIG. 8 is a top view of another display panel according to an embodiment of the present disclosure.

FIG. 8 is a top view of another display panel according to an embodiment of the present disclosure. As shown in FIG. 8, a plurality of support structures 5 is arranged around the display region 3. In this case, the support stability of the display panel can be improved, and the deformation of the first substrate 1 can be reduced in all directions.

In addition, with further reference to FIG. 8, a distance L3 between any two adjacent support structures 5 may be set to be greater than or equal to 5 µm. It should be noted that the region between the display region 3 and the encapsulation region 4 can include four sub-regions that are connected. When multiple support structures 5 are arranged around the display region 3 for multiple times, the distance L3 between two adjacent support structures 5 represents both a distance between two adjacent support structures 5 in a direction parallel to an extending direction of this sub-region and a distance between the support structures 5 in the direction from the display region 3 towards the encapsulation region 4.

If the distance between two adjacent support structures 5 is smaller than 5 µm, the support structures 5 are too close to each other. In this case, the two adjacent support structures 5 may be fused together when forming the support structures 5. In order to avoid such a problem, the distance between two adjacent support structures 5 can be set to be greater than or equal to 5 µm, so as to achieve stability of the support structures.

Figure 9:
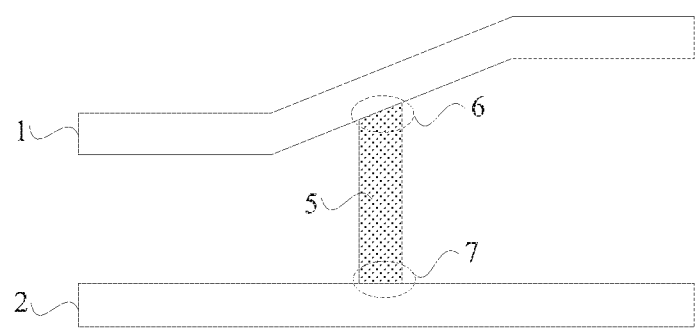
FIG. 9 is a schematic structural view of a support structure according to an embodiment of the present disclosure.

FIG. 9 is a schematic structural view of a support structure provided by an embodiment of the present disclosure. As shown in FIG. 9, the support structure 5 has a first support surface 6 facing the first substrate 1 and a second support surface 7 facing the second substrate 2. The first support surface 6 fits into the first substrate 1 in a region of the first substrate 1 where the first substrate 1 is in contact with the first support surface 6. Taking the direction shown in FIG. 9 as an example, each support structure 5 has a top surface and a bottom surface. The first support surface 6 is the top surface of the support structure 5, and the first support surface 6 is in contact with the first substrate 1. The second support surface 7 is the bottom surface of the support structure 5, and the second support surface 7 is in contact with the second substrate 2.

Assuming that the first support surface 6 is a surface having a plurality of protrusions or tips, the first substrate 1 can only be in contact with an apex of the protrusion or the tip of the first support surface 6 when the support structure 5 supports the first substrate 1. This may result in poor support strength on the first substrate 1 by the support structure 5. Moreover, when the display panel falls off, there may be an increased difference between a stress at a position of the first substrate 1 where it is in contact with the protrusion or the tip and a stress at another position, which would reduce mechanical strength. Therefore, the first support surface 6 can be disposed obliquely with respect to the surface of the first substrate 1 or can be disposed in a flat surface parallel to the surface of the first substrate 1, such that the entire surface of the first support surface 6 can in contact with the first substrate 1, i.e., allowing the first support surface 6 to fit into the first substrate 1, thereby increasing a contact area between the support structure 5 and the first substrate 1 and thus improving the support stability.

Figure 10:
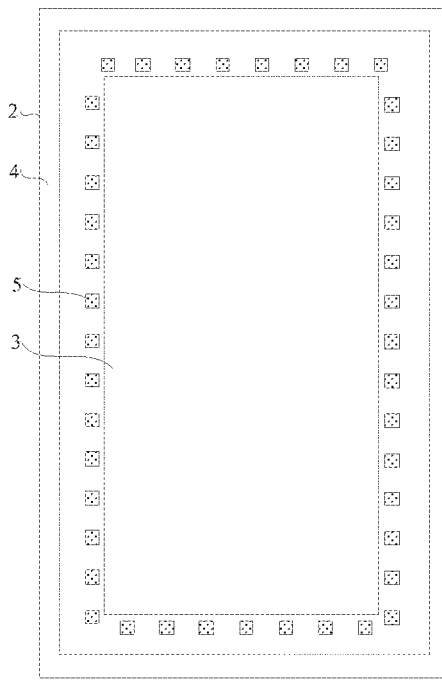
FIG. 10 is a top view of still another display panel according to an embodiment of the present disclosure.

In an embodiment, as shown in FIG. 10, which is a top view of still another display panel according to an embodiment of the present disclosure, the support structure 5 can be formed in an approximately polygonal structure. With further reference to FIG. 8, the support structure 5 can be formed in an approximately spherical structure or an approximately cylindrical structure. It should be noted that the support structure 5 can also be formed in other structures as long as the height of the support structure 5 is in a range between h1 and h2, and no further limitation will be made in the embodiments of the present disclosure.

Figure 12:
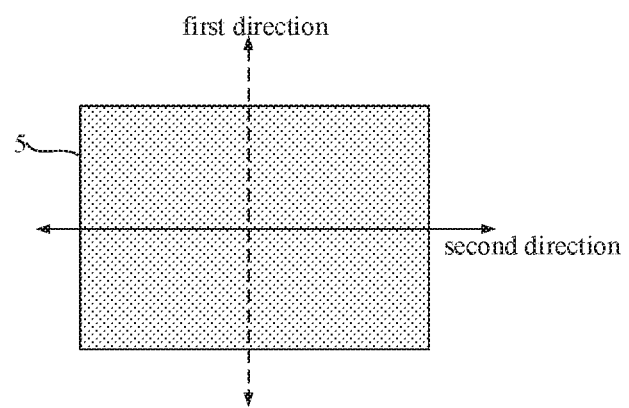
FIG. 12 is a top view of a support structure when the support structure is formed in an approximately polygonal structure according to an embodiment of the present disclosure.

As an example, the support structure 5 is formed in an approximately polygonal structure. As shown in FIG. 12, which is a top view of a support structure when the support structure is formed in an approximately polygonal structure according to an embodiment of the present disclosure, the support structure 5 has a width of l1 in a first direction and a width of l2 in a second direction is l2, and the first direction intersects with the second direction, where l1≥10 μm and l2≥10 μm.

Figure 11:
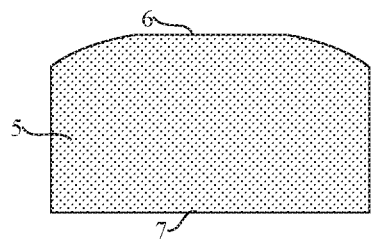
FIG. 11 is a side view of a support structure when the support structure is formed in an approximately polygonal structure according to an embodiment of the present disclosure.

It should be noted that the support structure 5 is usually made of an organic photoresist material. When the support structure 5 is formed by a photolithography process, on the one hand, the organic photoresist material is a gel-like material and its top would inevitably collapse downward, and on the other hand, when ultraviolet light irradiates the organic photoresist material, a part of the organic photoresist material that is shielded by a mask may be irradiated by ultraviolet light, resulting in that it may take a different time to wash away the part of the organic photoresist material by the developer compared to other parts and thus a periphery of the top of the organic photoresist material may collapse downward. Therefore, the formed support structure 5 may not have an expected polygonal, spherical or cylindrical structure. Details thereof can refer to FIG. 11, which illustrates a side view of the support structure 5 when the support structure 5 is formed in an approximately polygonal structure.

Taking the width l1 of the support structure 5 in the first direction as an example, if the width l1 of the support structure 5 in the first direction is smaller than 10 μm, the width of the support structure 5 in the first direction is narrow. As a result, after the top of the support structure 5 collapses downward, the remaining flat region in the middle of the top would be extremely narrow in the first direction, resulting in that this region is merely a straight line or a point. Then, the top of the support structure 5 may be in contact with the first substrate 1 in a linear contact or a point contact, and thus the support strength is poor. In view of this, in an embodiment, l1 is set to be greater than or equal to 10 μm, such that the flat region in the middle of the top can still have a certain width in the first direction after the top of the support structure 5 collapses, and thus this region can be in contact with the first substrate 1 in a surface contact manner, thereby increasing the support strength. The same can apply to the width l2 of the support structure 5 in the second direction, and details thereof will not be further described herein.

In an embodiment, l1 and l2 can satisfy:

$$1 \le \frac{l2}{l1} \le 2.$$

As an example, the support structure 5 is formed in an approximately cuboid structure. If $$\frac{l2}{l1} < 1 \text{ or } \frac{l2}{l1} > 2,$$

the width of the support structure 5 in the first direction is greatly different from the width of the support structure 5 in the second direction, such that the support structure 5 is formed in an approximately cuboid structure having a slender shape. In this case, after the top of the support structure 5 collapses downward, the width of the flat region in the middle of the top in the first direction is greatly different from the width of the flat region in the middle position of the top in the second direction, resulting in that this region is formed in an approximately straight line. This may lead to poor support strength on the first substrate 1 by the support structure 5. Setting $$1 \le \frac{l2}{l1} \le 2$$

can reduce the difference between the width of the support structure 5 in the first direction and the width of the support structure 5 in the second direction, such that the width of the flat region in the middle of the top in the first direction is closer to the width of the flat region in the middle of the top in the second direction, thereby preventing it from being formed in an approximately straight line and thus improving the support stability of the support structure 5 to the first substrate 1.

Figure 13:
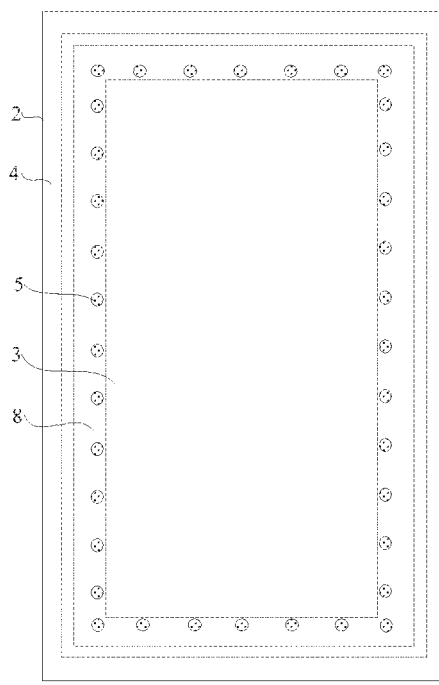
FIG. 13 is a top view of yet still another display panel according to an embodiment of the present disclosure.

FIG. 13 is a top view of yet still another display panel according to an embodiment of the present disclosure. As shown in FIG. 13, a peripheral circuit setting region 8 surrounding the display region 3 is disposed between the display region 3 and the encapsulation region 4. The support structure 5 is located within the peripheral circuit setting region 8 and in a part of the peripheral circuit setting region 8 close to the display region 3.

It should be noted that a plurality of pixel circuits arranged in a matrix and signal lines connected to the pixel circuits, such as gate lines and data lines, are provided in the display region 3. The peripheral circuit refers to a circuit for supplying a drive signal to a signal line, such as a gate scan circuit. A connection trace for connecting the peripheral circuit to the signal line in the display region 3 is usually provided in a part of the peripheral circuit setting region 8 close to the display region 3. Thus, arranging the support structure 5 in the part of the peripheral circuit setting region 8 close to the display region 3 can prevent the support structure 5 from contacting devices in the peripheral circuit, thereby preventing the support structure 5 from adversely affecting the devices in the peripheral circuit.

In an embodiment, the support structure 5 can be provided on the first substrate 1 or can be provided on the second substrate 2. In this case, the support structure 5 can be fixed on the first substrate 1 or on the second substrate 2. When an external force and the like leads to the display panel, this can prevent the support structure 5 from moving under the external force and the like, thereby further improving the support stability of the display panel.

In an embodiment, the first substrate 1 is an encapsulation substrate, and the second substrate 2 is an array substrate. When the display panel is a rigid display panel, both the encapsulation substrate and the array substrate can be glass substrates. When the display panel is a flexible display panel, the array substrate is a flexible substrate, and the encapsulation substrate is an encapsulation layer. The flexible substrate is a substrate having stretchable, foldable, bendable and curlable properties, and can be made of a flexible material such as polyimide (PI), polycarbonate (PC), polyethersulfone (PES), polyethylene terephthalate (PET), polyethylene naphthalate (PEN), polyarylate (PAR) or glass-fiber reinforced plastic (FRP).

Figure 14:
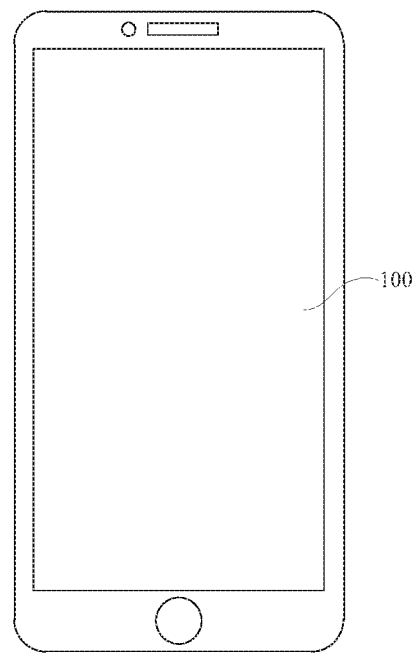
FIG. 14 is a schematic structural diagram of a display device according to an embodiment of the present disclosure.

An embodiment of the present disclosure further provides a display device. FIG. 14 is a schematic structural diagram of a display device according to an embodiment of the present disclosure. As shown in FIG. 14, the display device includes the display panel 100 described above. The structure of the display panel 100 has been described in detail in the above embodiments, and details thereof will not be further described herein. It should be noted that the display device shown in FIG. 14 is merely illustrative, and in practical applications, the display device can be any electronic device having a display function, such as a cellphone, a tablet computer, a notebook computer, an electronic paper book, or a television.

The display device provided by this embodiment of the present disclosure includes the display panel 100 described above. Therefore, with the display device, the deformation of the first substrate of the display panel can be reduced, the mechanical strength of the display device can be improved, and the possibility of damage can be reduced when the display device falls off.

What is claimed is:

1. A display panel, comprising:
a first substrate,
a second substrate, and
at least one support structure,
wherein the first substrate and the second substrate are disposed opposite to each other, and a region between the first substrate and the second substrate comprises a display region and an encapsulation region surrounding the display region; wherein a distance between the first substrate and the second substrate corresponding to the display region is h1, and a distance between the first substrate and the second substrate corresponding to the encapsulation region is h2, where h1>h2;
wherein the at least one support structure is disposed between the display region and the encapsulation region, and each of the at least one support structure has a height of h3, where h2<h3<h1;
wherein the at least one support structure comprises a plurality of support structures arranged along a direction from the display region towards the encapsulation region, and heights of the plurality of support structures are decreased gradually along the direction from the display region towards the encapsulation region;
wherein a distance between every two adjacent support structures of the plurality of support structures decreases gradually along the direction from the display region towards the encapsulation region.

2. The display panel according to claim 1, wherein the at least one support structure comprises at least two support structures arranged along a direction from the display region towards the encapsulation region, wherein one highest support structure of the at least two support structures has a height of h31, and one lowest support structure of the at least two support structures has a height of h32, where h2<h32≤h31<h1.

3. The display panel according to claim 1, wherein a difference between heights of every two adjacent support structures of the plurality of support structures has a same value.

4. The display panel according to claim 1, wherein h3 corresponding to the plurality of support structures, h1 and h2 satisfy a linear functional relation.

5. The display panel according to claim 1, wherein a minimum distance between the at least one support structure and the encapsulation region is greater than or equal to 100 μm.

6. The display panel according to claim 1, wherein a minimum distance between the at least one support structure and the display region is greater than or equal to 5 μm.

7. The display panel according to claim 1, wherein the at least one support structure comprises a plurality of the support structures arranged around the display region.

8. The display panel according to claim 7, wherein a distance between any two adjacent support structures of the plurality of the support structures is greater than or equal to 5 μm.

9. The display panel according to claim 1, wherein each of the at least one support structure comprises a first support surface facing the first substrate and a second support surface facing the second substrate, and the first support surface fits into the first substrate in a region of the first substrate where the first substrate is in contact with the first support surface.

10. The display panel according to claim 1, wherein each of the at least one support structure is formed in an approximately polygonal structure, an approximately spherical structure, or an approximately cylindrical structure.

11. The display panel according to claim 1, wherein a width of each of the at least one support structure in a first direction is l1, a width of each of the at least one support structure in a second direction is l2, and the first direction intersects with the second direction, where l1≥10 μm and l2≥10 μm.

12. The display panel according to claim 1, wherein a width of each of the at least one support structure in a first direction is l1, and a width of each of the at least one support structure in a second direction is l2, where $$1 \le \frac{l2}{l1} \le 2.$$

13. The display panel according to claim 1, wherein a peripheral circuit setting region is disposed between the display region and the encapsulation region, and the at least one support structure is located within the peripheral circuit setting region and in a part of the peripheral circuit setting region close to the display region.

14. The display panel according to claim 1, wherein the first substrate is an encapsulation substrate, and the second substrate is an array substrate.

15. A display device, comprising:
a display panel, wherein the display panel includes:
a first substrate,
a second substrate, and
at least one support structure,
wherein the first substrate and the second substrate are disposed opposite to each other, and a region between the first substrate and the second substrate comprises a display region and an encapsulation region surrounding the display region; wherein a distance between the first substrate and the second substrate corresponding to the display region is h1, and a distance between the first substrate and the second substrate corresponding to the encapsulation region is h2, where $h1>h2$; and wherein the at least one support structure is disposed between the display region and the encapsulation region, and each of the at least one support structure has a height of h3, where $h2<h3<h1$;

wherein the at least one support structure comprises a plurality of support structures arranged along a direction from the display region towards the encapsulation region, and heights of the plurality of support structures are decreased gradually along the direction from the display region towards the encapsulation region;

wherein a distance between every two adjacent support structures of the plurality of support structures decreases gradually along the direction from the display region towards the encapsulation region.

* * * * *